US011734310B2

(12) United States Patent
Daga et al.

(10) Patent No.: US 11,734,310 B2
(45) Date of Patent: Aug. 22, 2023

(54) INSIGHTS FOR MULTI-DIMENSIONAL PLANNING DATA

(71) Applicant: Oracle International Corporation, Redwood Shores, CA (US)

(72) Inventors: Manish Daga, Bangalore (IN); Shivaranjan Gurunanjappa, Gubbalala (IN)

(73) Assignee: Oracle International Corporation, Redwood Shores, CA (US)

( * ) Notice: Subject to any disclaimer, the term of this patent is extended or adjusted under 35 U.S.C. 154(b) by 211 days.

(21) Appl. No.: 16/806,539

(22) Filed: Mar. 2, 2020

(65) Prior Publication Data
US 2021/0081386 A1   Mar. 18, 2021

(30) Foreign Application Priority Data

Sep. 13, 2019   (IN) .............................. 201941036960

(51) Int. Cl.
| | | |
|---|---|---|
| G06F 16/28 | (2019.01) | |
| G06F 16/22 | (2019.01) | |
| G06F 18/22 | (2023.01) | |

(52) U.S. Cl.
CPC ........ G06F 16/283 (2019.01); G06F 16/2264 (2019.01); G06F 18/22 (2023.01)

(58) Field of Classification Search
CPC .. G06F 16/2264; G06F 16/283; G06K 9/6215
See application file for complete search history.

(56) References Cited

U.S. PATENT DOCUMENTS 7,092,929 B1 * 8/2006 Dvorak ................. G06Q 30/00
706/14
7,480,623 B1   1/2009 Landvater
(Continued)

OTHER PUBLICATIONS

Gogi et al, "A preliminary study on the role of simulation models in generating insights," WSC '14: Proceedings of the 2014 Winter Simulation Conference Dec. 2014 pp. 3618-3629 (Year: 2014).*
(Continued)

*Primary Examiner* — Mark D Featherstone
*Assistant Examiner* — Kweku William Halm
(74) *Attorney, Agent, or Firm* — Potomac Law Group, PLLC

(57) ABSTRACT

Systems and methods are provided for generating new insights for multi-dimensional data. A plurality of insight definitions that define insights within multi-dimensional data can be received, where the multi-dimensional data include dimensions organized in a hierarchical structure, and the insight definitions include members across the hierarchical dimensions that define a slice of the multi-dimensional data. Descriptive data about a candidate insight defined by at least one of the insight definitions that corresponds to a candidate slice of the multi-dimensional data can be received. A new insight definition based on the candidate insight can be generated, where the new insight definition corresponds to a new slice of the multi-dimensional data, and the new slice of the multi-dimensional data is proximate to the candidate slice of the multi-dimensional data with respect to the hierarchical structure.

20 Claims, 13 Drawing Sheets

(56) References Cited

U.S. PATENT DOCUMENTS

| | | | |
|---|---|---|---|
| 7,644,009 | B2 | 1/2010 | Amerasinghe et al. |
| 8,364,676 | B2 | 1/2013 | Handy et al. |
| 2008/0172287 | A1 | 7/2008 | Tien et al. |
| 2014/0258311 | A1* | 9/2014 | Hamborg .......... G06F 16/24578 |
| | | | 707/736 |
| 2015/0379449 | A1 | 12/2015 | Gopinath et al. |
| 2017/0140402 | A1 | 5/2017 | Doi |
| 2018/0357276 | A1* | 12/2018 | Ding ..................... G06Q 10/06 |
| 2019/0332610 | A1* | 10/2019 | Krishna .............. G06F 16/2457 |
| 2019/0366189 | A1* | 12/2019 | Plant .................. A63B 71/0622 |
| 2019/0370046 | A1* | 12/2019 | Bharde ................ G06K 9/6215 |
| 2021/0209125 | A1* | 7/2021 | Tokarev Sela ...... G06F 16/9024 |

OTHER PUBLICATIONS

"Forecasting", SAP Help Portal, SAP ERP (/viewer/product/SAP_ERP/6.18.06/en-US), SAP for Professional Services, downloaded Oct. 16, 2017.

Stefan De Kok, "Should You Forecast Monthly or Weekly?", Published on Nov. 9, 2016, Retrieved from https://www.linkedin.com/pulse/should-you-forecast-monthly-weekly-stefan-de-kok on Mar. 19, 2018.

Unknown, SAP Help Portal, "Enhanced Forecasting Objects", Version 6.0 EHP8 SP06, Retrieved from: https://help.sap.com/viewer/1db360e2b9af40c488cc47df487a2ca3/6.18.06/en-US/a3c75749af48480d91c22050382c2bbc.html on Mar. 19, 2018.

* cited by examiner

| Position ▲▽ | Dimensions | Members | Density |
|---|---|---|---|
| 1 | Account | 8 | ● Dense  ○ Sparse |
| 2 | Period | 13 | ● Dense  ○ Sparse |
| 4 | Product | 15 | ○ Dense  ● Sparse |
| 5 | Market | 9 | ○ Dense  ● Sparse |
| 6 | Entity | 5 | ○ Dense  ● Sparse |
| 7 | Years | 14 | ○ Dense  ● Sparse |
| 8 | Scenario | 0 | ○ Dense  ● Sparse |
| 9 | Version | 0 | ○ Dense  ● Sparse |
| 10 | Currency | 5 | ○ Dense  ● Sparse |

Fig. 12

INSIGHTS FOR MULTI-DIMENSIONAL PLANNING DATA

FIELD

The embodiments of the present disclosure generally relate to data analytics, and more particularly to generating insights for multi-dimensional data.

BACKGROUND

Data planning, analytics, and processing for entities and/or scenarios can be performed over various intervals or granularities, and can involve historical data and forecast data (e.g., data predictions). Often, these data planning models involve multi-dimensional data that can include complex intersections of members across various data dimensions. For example, forecasting scenarios that enable powerful modeling for decision makers can include numerous potential cross-sections of data. The generation of insights into these data analytics that provide enhanced business intelligence can be beneficial to users. In addition, the functionality to apply insights for certain intersections or slices of multi-dimensional data to other intersections or slices of data accomplishes a machine based and automated value adding intelligence.

SUMMARY

The embodiments of the present disclosure are generally directed to systems and methods for generating insights for multi-dimensional data. A plurality of insight definitions that define insights within multi-dimensional data can be received, where the multi-dimensional data include dimensions organized in a hierarchical structure, and the insight definitions include members across the hierarchical dimensions that define a slice of the multi-dimensional data. Descriptive data about a candidate insight defined by at least one of the insight definitions that corresponds to a candidate slice of the multi-dimensional data can be received. A new insight definition based on the candidate insight can be generated, where the new insight definition corresponds to a new slice of the multi-dimensional data, and the new slice of the multi-dimensional data is proximate to the candidate slice of the multi-dimensional data with respect to the hierarchical structure.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIGS. 10-12 illustrate dimensions and members of a multi-dimensional data model according to an example embodiment.

DETAILED DESCRIPTION

Embodiments generate insights for multi-dimensional data. For example, intersections or a slice of data across members of various of dimensions of data can provide meaningful business intelligence, such as the forecast for sales data of a certain product or product line during a certain time of year for a certain store or geographic location. Insights into these slices of data can provide enhanced business intelligence. Examples of insights include anomalies that can be discovered in multi-dimensional data. In some embodiments, there are various types of insights that can be detected. Some insights involve historical data, such as a bias in forecast estimates versus the actual data (e.g., observed data). Other insights involve future data, such as a discrepancy between a human planner's forecast and an automated prediction. Embodiments define or receive definitions for insights into multi-dimensional data (e.g., enterprise planning data).

Embodiments identify useful new insights based on an initial set of insights and user feedback about the initial set of insights. For example, insight definitions can be automatically generated based on the user feedback and the structure of a multidimensional data model. The multidimensional data model can include enterprise data and the structural characteristics used by embodiments to generate new insights can include a hierarchical structure of the multi-dimensional data, a common parent for the initial insight definitions, common attributes for the initial insight definitions, determining valid combinations when traversing the multi-dimensional data model, or financial intelligence such as account type, time balance property, and the like. In some embodiments, a new insight definition can be generated that is broader than the initial insight definition or initial insight definitions used to generate it. In other words, the new insight definition can cover a larger portion of the multi-dimensional data model (e.g., a large slice or intersection of the data) than the initial insight(s) used to generate the new insight definition.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
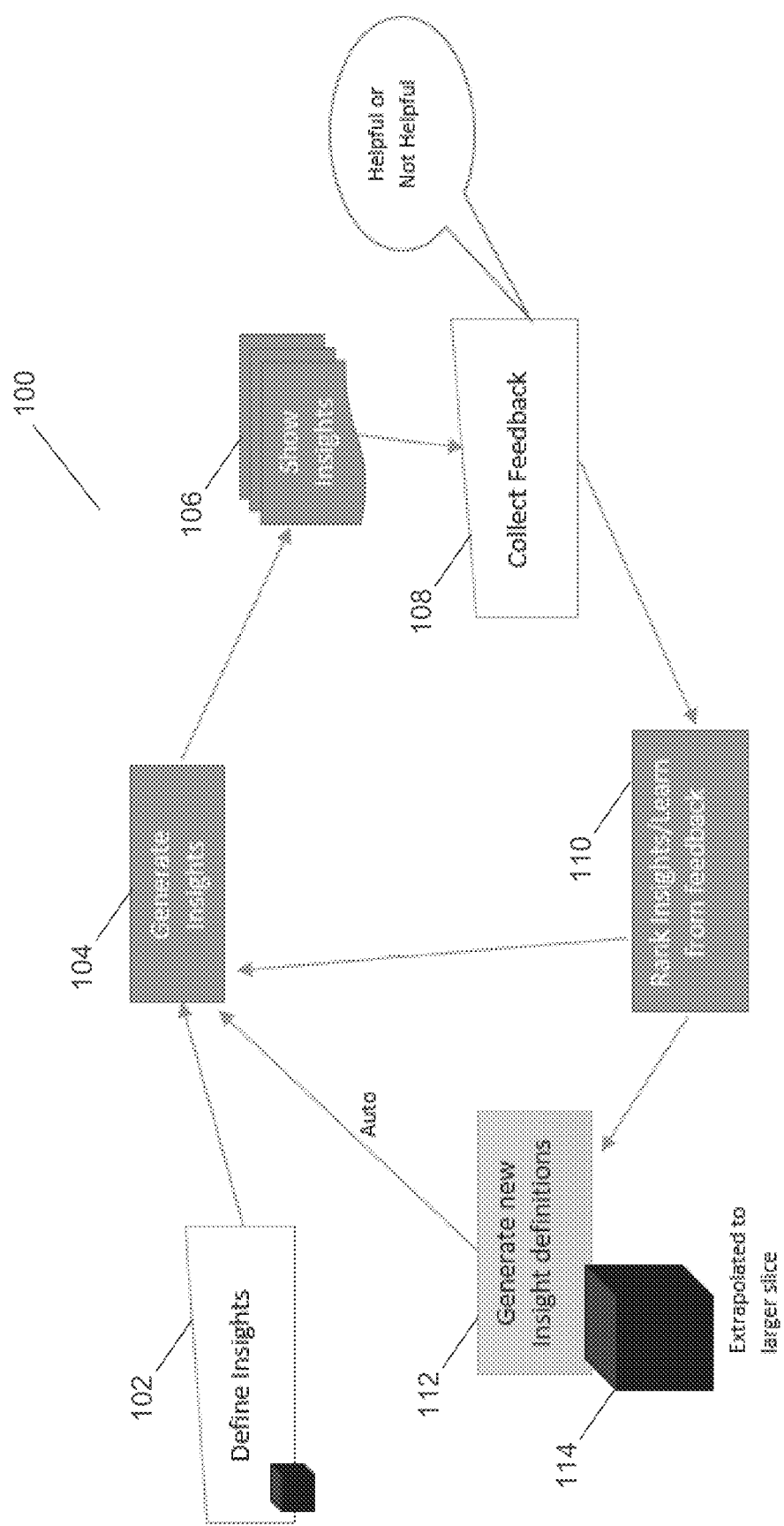
FIG. 1 illustrates a system for generating insights for multi-dimensional data according to an example embodiment.

FIG. 1 illustrates a system for generating insights for multi-dimensional data according to an example embodiment. System 100 includes insight definitions 102, generated insights 104, displayed insights 106, feedback 108, ranking 110, new insights 112, and extrapolation 114 based on initial insight definitions. For example, system 100 can be used to generate new insight definitions for multi-dimensional data based on an initial insight definition or definitions.

Insight definitions 102 can be any suitable definitions of an insight (e.g., anomaly or correlation) into multi-dimensional data. For example, the interface depicted in FIG. 4 can be used to define an insight, insights definitions can be received, or any other suitable manner of implementing insight definitions can be utilized. Based on insight definitions 102, generated insights 104 can be produced. For example, insight definitions 102 can include a formula that includes elements of data within one or more slices of a multi-dimensional data model, and generated insights 104 can use the actual data values stored within the multi-dimensional data model to produce generated insights 104. In other words, the insight definition can include the dimension members that intersect to form a given element of data (e.g., forecast for sales data of a certain product or product line during a certain time of year for a certain store or geographic location) and the generated insight can use the data value(s) stored at the intersection.

In some embodiments, generated insights 104 can be used to generate displayed insights 106, which can be displayed to a user, for example in a user interface. Based on generated insights 104 and/or displayed insights 106, feedback 108 can be collected about the insights. The feedback can indicate whether the insights were helpful, practical, and/or useful. The insights can then be ranked according to the feedback to generate ranking 110. Based on the rankings for the insights, one or more insights can be selected to be used to generate new insights 112. For example, the intersection(s) of data defined for the selected insight can be used to generate extrapolations 114, which in turn can generate new/different insights that are defined by intersections of data that are proximate to the intersections of data for the selected insight.

Figure 2:
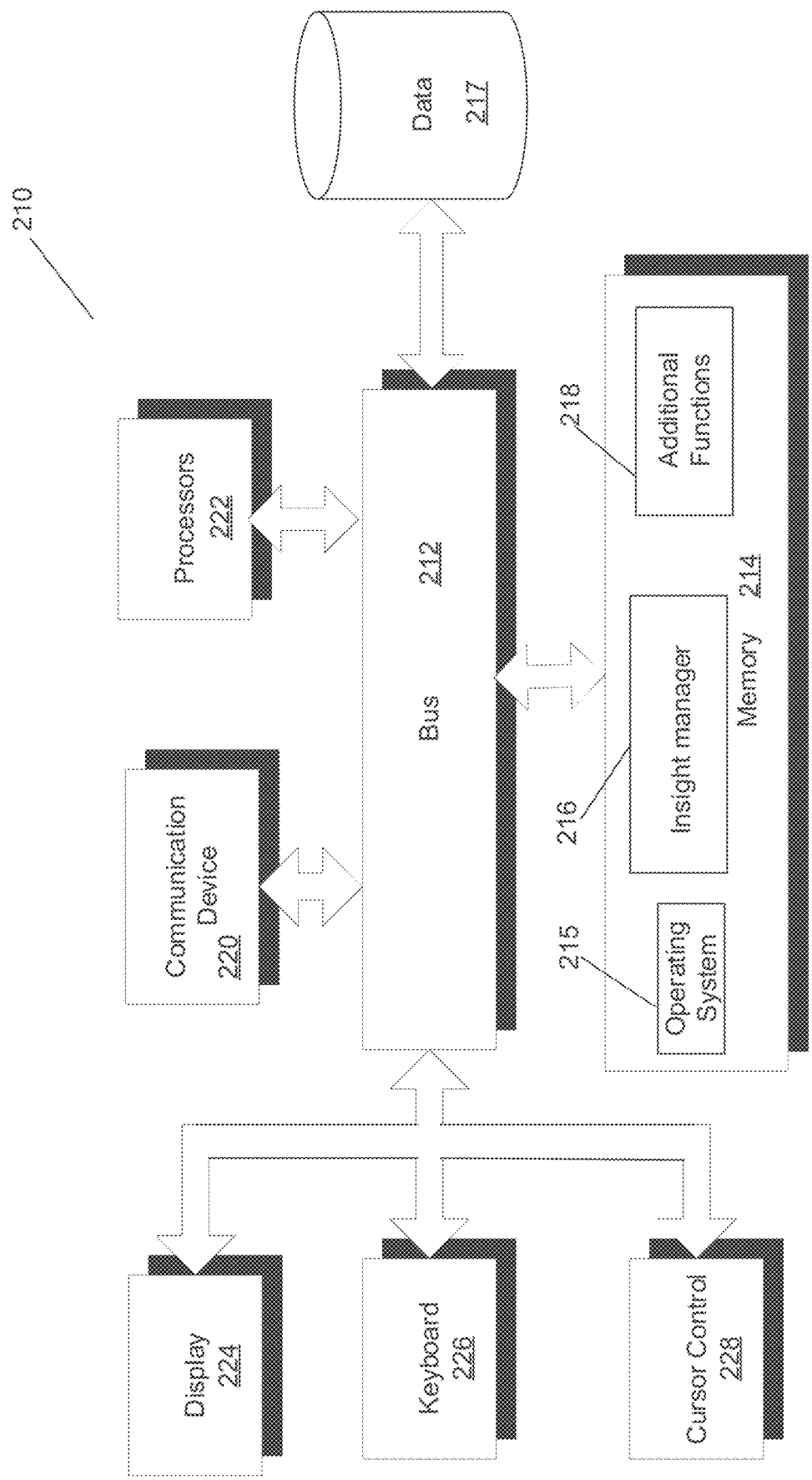
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, insight manager component 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, insight manager component 216, as well as other applications modules 218. Operating system 215 provides operating system functionality for system 210. Insight manager component 216 may provide system functionality for predicting an database migration techniques, or may further provide any other functionality of this disclosure. In some instances, insight manager component 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of the Oracle® Enterprise Resource Planning ("ERP") Cloud, and/or engagement engine ("EE") embedded in Oracle® Cloud, such as Oracle® Business Intelligence Enterprise Edition ("OBIEE"), Oracle® Data Integrator, for example. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Intersections or slices of multi-dimensional data can be analyzed/compared to generate insights about the data. Some embodiments include a hierarchical multi-dimensional data model, where members of a dimension further have child members. For example, a product member of the product dimension can include child members, such as a product line that features a variety of products within the product line. In this example, the product line member can be considered a parent member and the variety product members within the product line can be considered child members of the parent member. In some embodiments, the member hierarchy can include a number of levels, such a three (e.g., grandparent, parent, child), four, or many more.

In some embodiments, cross-sections, intersections, or slices of data can be retrieved as part of the generating and/or displaying of enterprise planning data. For example, selections can be received for slices or cross-sections of the multi-dimensional data that involve the display of various combinations or intersections of data elements. An example slice or cross-section of data can include a combination of a given plan (e.g., specific members of the plan dimension), product (e.g., specific members of the product dimension), and measures (e.g., specific members of the measures dimension).

In some embodiments, a user of planning software can accomplish multiple planning tasks using workbooks/worksheets. In an example, a workbook can be a user-defined data subset (e.g., from a database storing the enterprise data), or one or more slices or cross-sections of data, that includes selected dimensions (e.g., dimensions and/or specific dimension members). These workbooks can include views and graphical charts used for planning, viewing, and analyzing enterprise data. Workbooks can organize related planning information and divide levels of user responsibility. This framework can allow a user to easily view, create, modify, and store data sets that are common to repeated tasks.

An example structure for a multi-dimensional data model for some embodiments can include of the following elements: product levels and members such as a department, class, and sub-class for the men's sweater department; calendar levels and members such as half, month, and week for the Spring 2010 season; channel levels and members that may reflect multiple channels within an organization at their aggregate level, such as total in-store divisions, catalog, or e-Commerce (e.g., direct to consumer); plan versions such as Working Plan ("Wp"), Original Plan ("Op"), Current Plan ("Cp"), and Last Year ("Ly"); measures and corresponding business rules such as sales, receipts, inventory. In some embodiments, workbooks can be built automatically, through a batch process, or manually using a software wizard. Workbooks can contain the planning views, measures, and business rules used for a comprehensive plan. Data in a workbook can be displayed using both multidimensional spreadsheets and charts. The data can be viewed at a detailed level or at an aggregate level.

Figure 3:
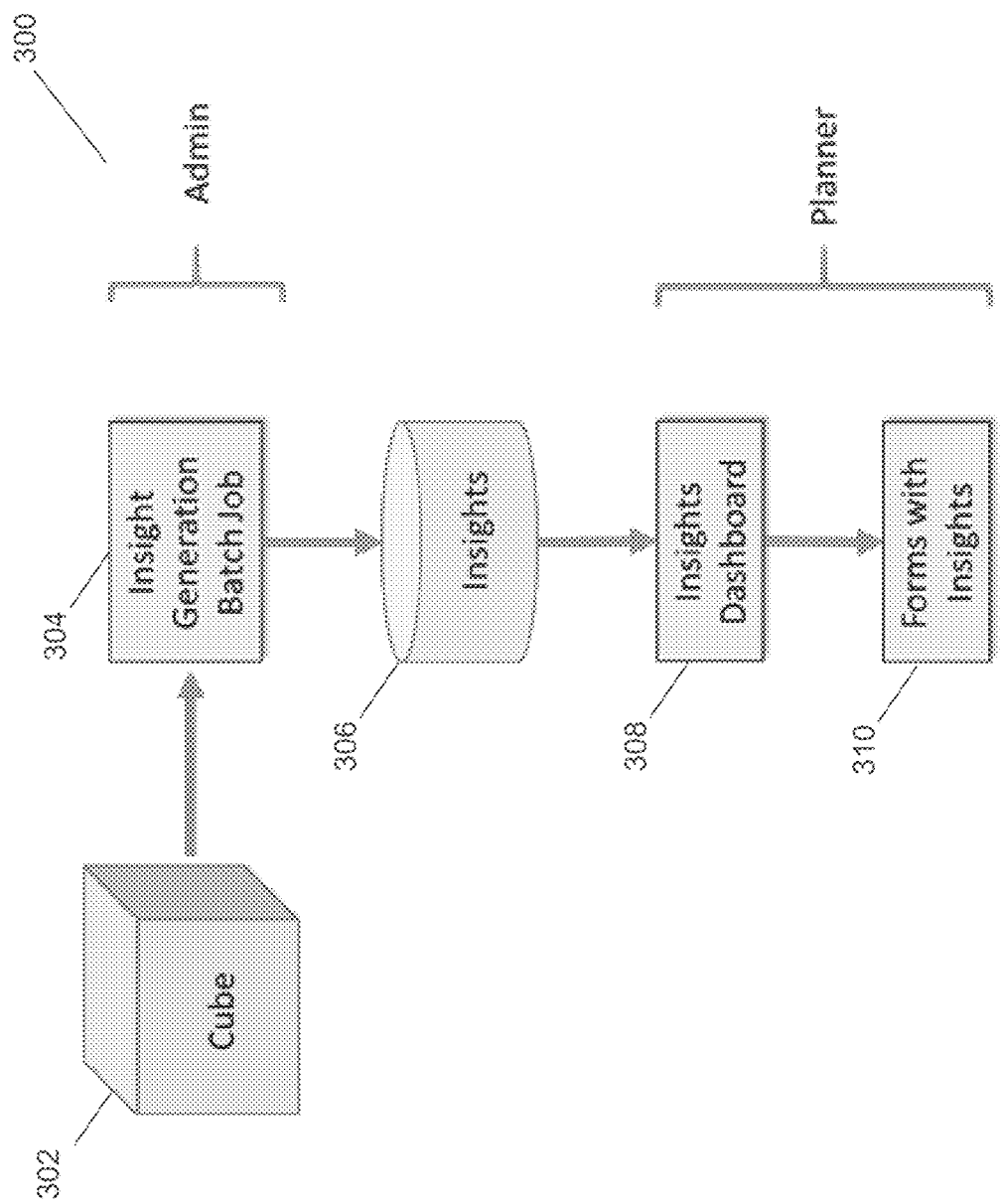
FIG. 3 illustrates an insight system according to an example embodiment.

FIG. 3 illustrates an insight system according to an example embodiment. System 300 includes cube 302, batch job 304, insights 306, insights dashboard 308, and forms with insights 310. In some embodiments, cube 302 includes multi-dimensional data, one or more slices of multi-dimensional data, and/or one or more intersections of multi-dimensional data. Batch job 304 can be a batch database job that generates insights 306 based on insight definitions and the data values stored in cube 302. Insights 306 can be displayed in insights dashboard 308 and/or forms with insights 310 can be displayed in a user interface. For example, FIGS. 4-8 illustrates user interfaces and forms that can be implemented in some embodiments.

In some embodiments, insights can include historical insights, future insights, recent anomaly insights, correlation insights, and others. For example, historical insights can measure the variance and/or bias between two historical scenarios, such as Forecasts and Actuals. Future insights can measure the variance between two future scenarios, such as Forecasts and Predictions (e.g., computer generated). For example, when comparing a scenario against the computer's prediction, a measure of risk can also be calculated (e.g., the risk of meeting the target forecast). Recent anomaly insights can detect anomalies in recent Actuals (e.g., current month or quarter). For example, they may include changes in Actuals from the base level (e.g., sudden volatility), or missing Actual data. In some embodiments, correlation insights can use machine learning to detect multivariate patterns and anomalies in the data. For example, machine learning can also be useful for generating more accurate computer predictions when compared against univariate predictions.

In some embodiments, various metrics can be produced for insight types. For example, historical insights might generate/use absolute variances, relative variances, and/or bias metrics to determine data values for the insights. In another example, future insights might generate/use absolute variances, relative variances, risk levels (e.g., based on prediction intervals), and/or growth rate differences to determine data values for the insights. The Appendix of Example Insight Types and Use Cases, filed herewith, includes additional details about insight types, metrics, use cases, and other information about insights implemented in embodiments.

The following represent example insights that can be implemented in some embodiments:

| Insight Type | Use Case | Description | Purpose | Timing in Planning Cycle | Action to Recommend for Planning Process |
|---|---|---|---|---|---|
| Historical | Planner Accuracy/ Bias | Variance between forecasts submitted by Planners and the Actuals Metrics Accuracy (for one period) | Evaluate human forecast accuracy and understand if Planners have a bias Allows Approver to determine | After load of actuals and before reviewing and/or approving submitted Forecast | Consider modifying the Budget/ Forecast by X % |

-continued

| Insight Type | Use Case | Description | Purpose | Timing in Planning Cycle | Action to Recommend for Planning Process |
|---|---|---|---|---|---|
| | | Bias (across multiple periods). Can specify # of years/cycles | whether to modify the Forecast based on bias from previous planning cycles. | | |
| Historical | Prediction Accuracy | Variance between Predictions and Actuals<br><br>Metrics Accuracy (for one period)<br><br>Bias (across multiple periods). Can specify # of years/cycles | Evaluate machine prediction accuracy and understand if the machine has a bias<br><br>Allows management to have more confidence in using machine predictions | Before each new Planning cycle | For Reporting |
| Historical | Last Month's Budget or Forecast vs Actuals | Variance between last month's Actuals and Budget or Forecast | Saves time so user doesn't have to manually run reports to know monthly variance | Every month after Actuals loaded<br><br>Forecast vs Actual is applicable to all businesses For some businesses, Budget vs Actuals is used during first three months of Planning cycle. For other business Budget vs Actuals is monitored throughout the year | For Reporting |
| Historical | Last Month's Prediction vs Actuals | Variance between last month's Prediction and Actuals | Monitor accuracy of Prediction in current planning cycle<br><br>Allows Planner/Approver to be confident in using Prediction as basis for next Forecast | Every month after Actuals loaded | If variance is out of range, user maybe cautious about using Prediction since there are issues with accuracy. For example, there may have been a one-off event like a marketing campaign to increase sales or a weather event (fire/hurricane) that reduced demand. |
| Future | Forecast vs Prediction (Quarterly/ Monthly/ Yearly) | Variance between future Forecast values (human) and the computer's Predictions | Notify the user when human Forecast varies from the machine's Predictions<br><br>Allows planner to modify their Forecast | Review prior to submitting next Forecast If cycle is monthly, every month If cycle is quarterly, after $3^{rd}$, $6^{th}$ and $9^{th}$ | If variance is out of range user may be cautious about using the Forecast over the Prediction since there could be issues with accuracy. |

-continued

| Insight Type | Use Case | Description | Purpose | Timing in Planning Cycle | Action to Recommend for Planning Process |
|---|---|---|---|---|---|
| | | Metrics Risk | based on machine's recommendation | months | |
| Recent Anomaly | Recent Actuals | Removes recent Actuals from the historical data and runs another Prediction that compares the new predicted Actuals to the observed Actuals<br><br>Metrics Upward spike Downward spike Missing data | Notify users of unexpected value in latest month's Actuals | Every month after Actuals loaded | If variance is out of range user may be cautious about using Prediction for future Forecasts since there will be issues with accuracy since the Prediction was based on Actuals. For example, there may have been a one-off event like a marketing campaign to increase sales or a weather event (fire/hurricane) that reduced demand. |
| Growth Rate | Growth Rate of Actuals vs Prediction | Compares the growth rate of Actuals for the last year against an automated Prediction for the next year | Allows Approver to determine if they should modify the Budget/Forecast based on growth rate differences | Review prior to submitting Budget/Forecast | Consider modifying the Budget/Forecast by X % |
| Correlation | TBD | Use machine learning to detect relationships between multiple variables | Enhances planning by using more than one variable to improve Budgets, Forecasts and Predictions | Every month after Actuals loaded<br><br>Every year before reviewing and/or approving Budget<br><br>Every month/quarter Before reviewing and/or approving Forecast | Consider modifying the Budget/Forecast by X % |

In some embodiments, insights defined by a user, default insights, predefined insights, or any other suitable defined insight can be analyzed to determine whether the insight is applicable to other portions/intersections/slices of the data (e.g., multi-dimensional data model). For example, an insight that compares sales data of a certain product across different plan s/forecasts/actuals may be applicable to a similar product. In addition, an insight based on a comparison between forecast data for a given plan and actual data may be applicable to forecast data for a different plan. Embodiments implement functionality for generating new insights into slices of data based on similarity to a slice of data with a defined insight.

Figure 4:
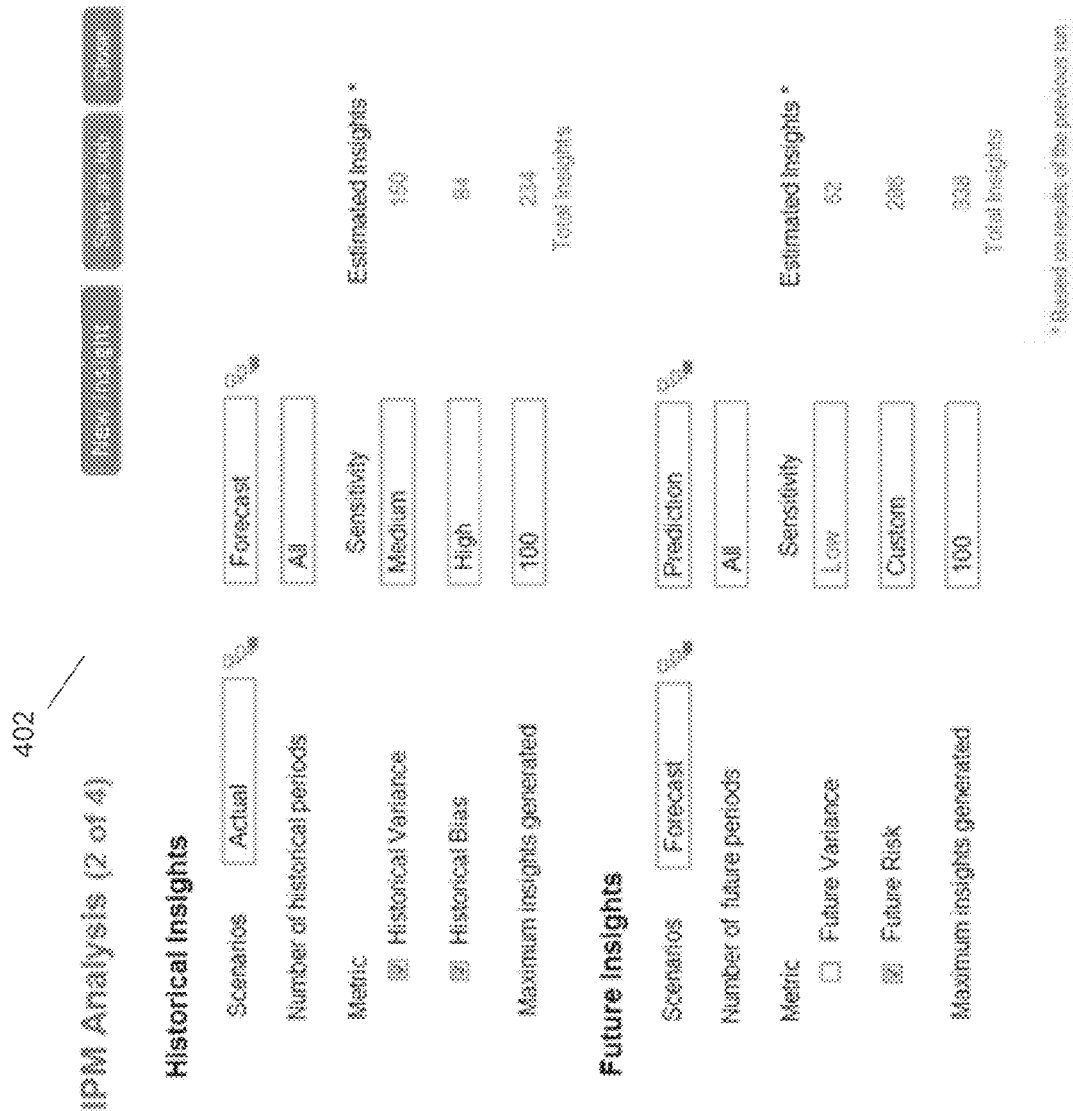
FIG. 4 illustrates a user interface configured to generate insights according to some embodiments.

FIG. 4 illustrates a user interface configured to generate insights according to some embodiments. In some embodiments, the user interface 402 can be used to run a "job", such as a database batch process, that generates insights based on defined insights. For example, for each insight type, corresponding metrics to analyze (e.g., defined metrics) can be selected. In some embodiments, a sensitivity level that defines the number of insights generated for each metric can also be selected. For example, options can include Low, Medium, High, and/or Custom. In some embodiments, the Custom setting can allow user defined individual thresholds for metrics. In some embodiments, an estimate can be displayed in user interface 402 next to each metric using the previous job run's data that is based on the currently selected sensitivity. For example, by entering different sensitivity levels, it can be estimated how many insight results will be generated for each metric for the current job. In some embodiments, each insight type can also have a Maximum Insights setting (e.g., to mitigate the risk of overload if conditions have changed).

Figure 5:
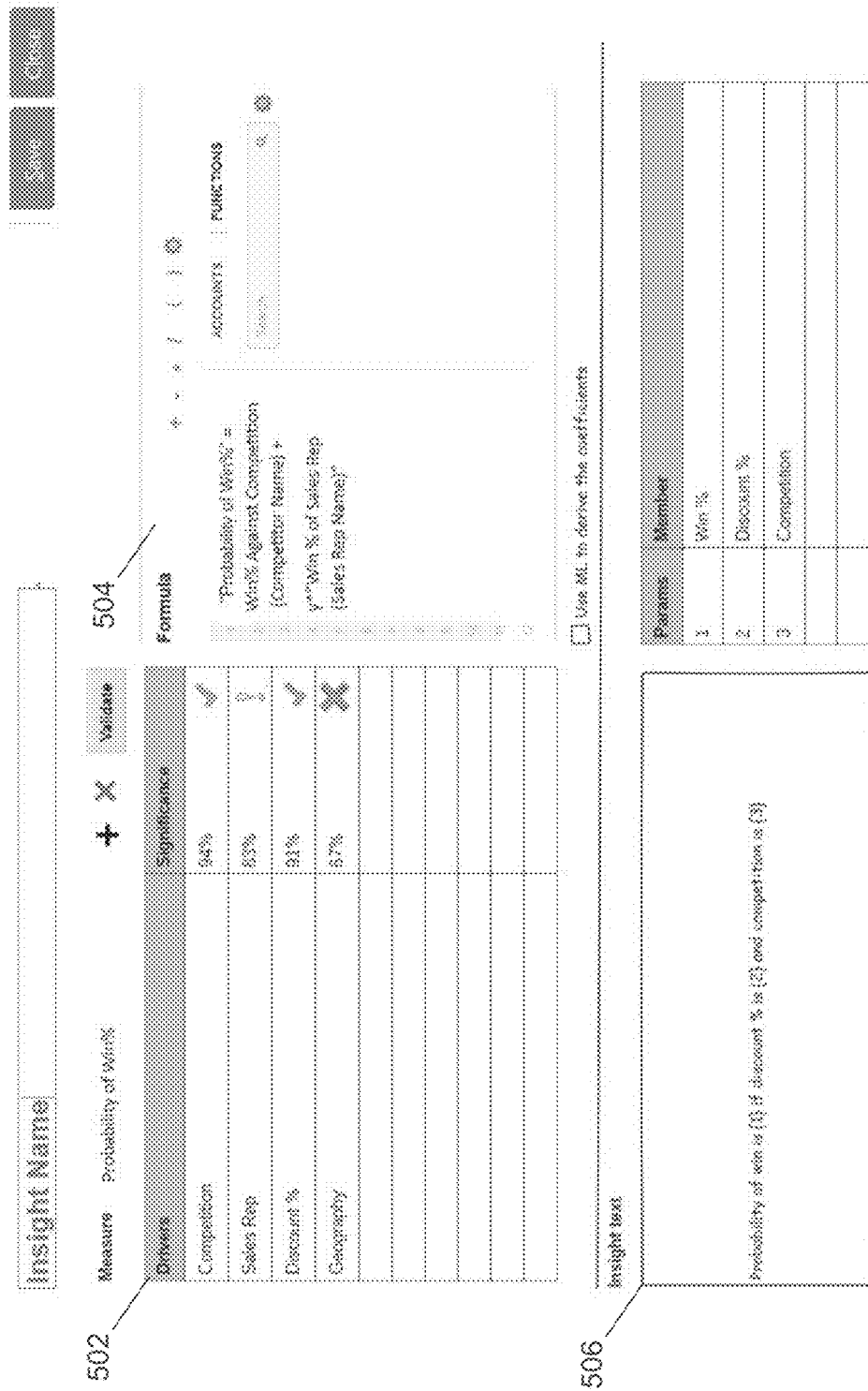
FIG. 5 illustrates a user interface for defining insights according to an example embodiment.

FIG. 5 illustrates a user interface for defining insights according to an example embodiment. For example, drivers 502 for the defined insight, or dimension members across dimensions of data, can be input. Formula 504 can be defined that is used to calculate a metric for the insight. For example, formula 504 illustrates a formula for calculating the "probability of win %". In some embodiments, the significance of the drivers can be displayed in the user interface to inform the user of their relevance to the insight/metric. In some embodiments, a machine learning implementation can be used to learn weights, or coefficients, for drivers to derive a formula. For example, existing data can be used to determine correlations among the data and determine the weights/coefficients. Insight text 506 can be defined as a description for the insight.

Figure 6:
FIG. 6 illustrates a user interface for displaying insights according to an example embodiment.
Figure 7:
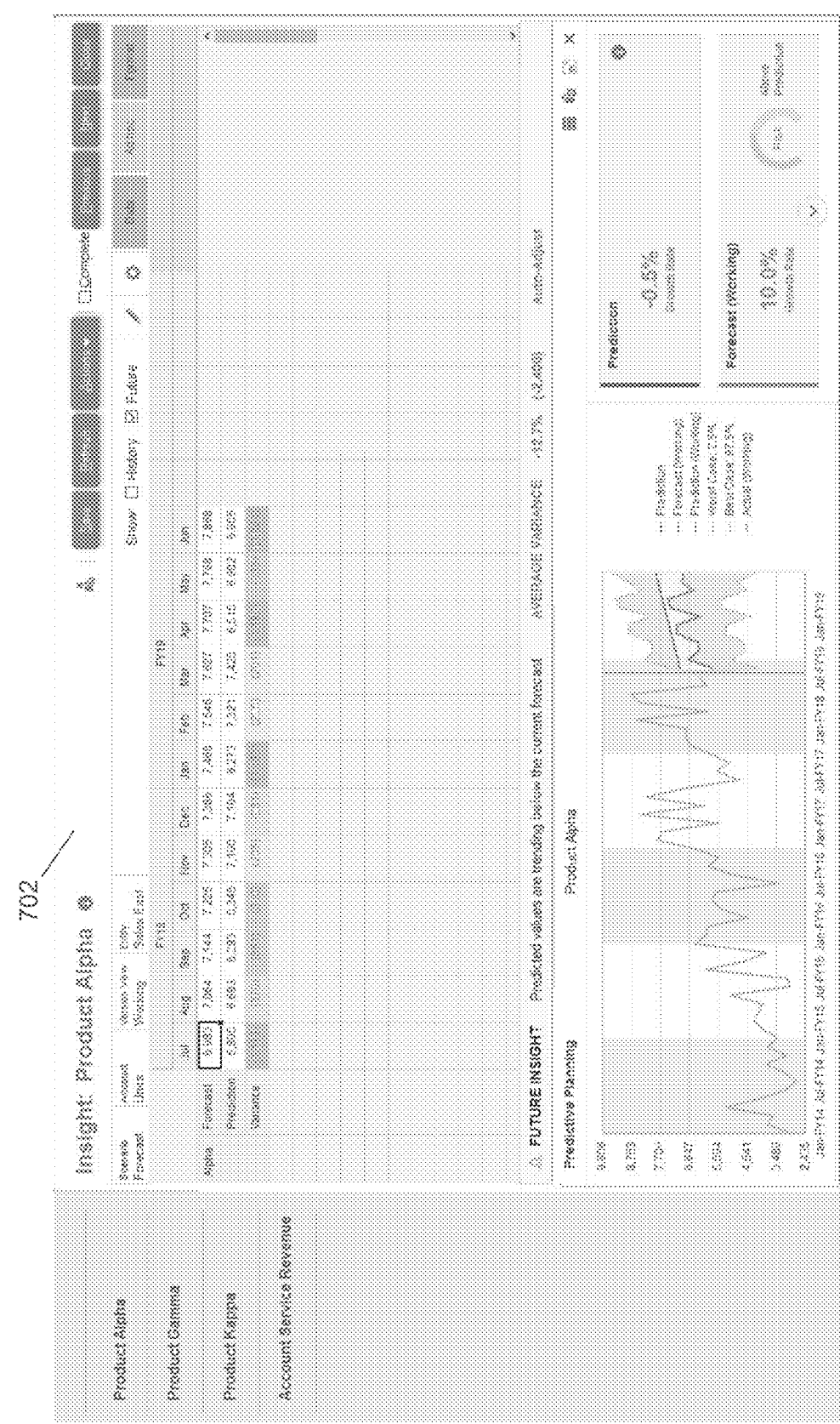
FIG. 7 illustrates another user interface for displaying insights according to an example embodiment.

FIGS. 6-7 illustrate user interfaces for displaying insights according to an example embodiment. For example, after a job process is used to generate insights based on insight definitions, the generated insights can be displayed on dashboard 602. Selection of one of the insight categories or groups provides a detailed view of the generated insights. User interface 702 is configured to display a detailed view of generated insights for a product. In particular, user interface 702 displays generated insights for a product Alpha. As illustrated, a number of variance values (e.g., a metric for the insight) are flagged because they are outside a criteria for normal values. In some embodiments, an "auto-adjust" functionality can be used to change data values for one of the subject dimension data members (e.g., one of predicted values or forecast values). In this example, since predicted values are generated by an algorithm, forecast values can be auto-adjusted in embodiments. When the auto-adjust functionality is used, it can automatically generate feedback about the usefulness of the insight/metric.

In some embodiments, feedback can be received about the defined/generated insights, or otherwise information may be obtained that indicates a usefulness of the insights, such as in the form of actions taken by the user upon receiving the insight. For example, it can be monitored whether a user took an action on the insight, such as adjusting a data value based on the insight or assigning the insight to a user for follow-up. It can also be determined whether the user action indicated that the insight was not useful, such as dismissing the insight without action or deleting the insight. In some embodiments, the feedback can be converted into a numeric rating or ranking (e.g., between 1 and 5). Below is an example rating or ranking for insights that can be utilized:
1. Rating 5—An auto-adjust action performed on an insight.
2. Rating 4—Manual adjustment to the data based on the insight.
3. Rating 3—Multiple views of the insight without leading to change in data. Making user think through the numbers.
4. Rating 2—Less than 2 views of the insight.
5. Rating 1—Dismissing the insight without looking at the numbers.

In some embodiments, based on this feedback, the insights (e.g., insight definitions) can be ranked (e.g., based on a usefulness metric). This ranking can be used to inform the generation or regeneration of additional or new insights. In some embodiments, a weighted average of the ratings for each insight definition can be calculated, and this result can be used to rank the definitions. Using this information, embodiments can generate new insights automatically for other regions/slices of data. In some embodiments, this ranking can also be used to select a candidate insight for additional analysis. For example, an insight that ranks high, such as above a threshold (e.g., ranks about a usefulness threshold or criteria based on a usefulness metric) or otherwise ranks highest amongst other insights, can be selected for additional analysis.

For example, it can be determined whether the candidate insight is applicable to other slices of the multi-dimensional data (e.g., slices that are similar to the slice of multi-dimensional data the candidate insight was defined to apply to, or the candidate slice of data). In some embodiments, a new insight applicable to a new slice of data can be defined that is similar to the candidate insight and the candidate slice of data based on proximity between the new slice and candidate slice within the multi-dimensional data model. In some embodiments, the new insight can apply to a broader slice of the multi-dimensional data than the candidate insight. Insights can then be generated based on this new and automatically defined insight. In some embodiments, after display, if this new insight is ranked above a criteria, its definition and applicable slice of data can then be used to iteratively generate another new insight.

Figure 8:
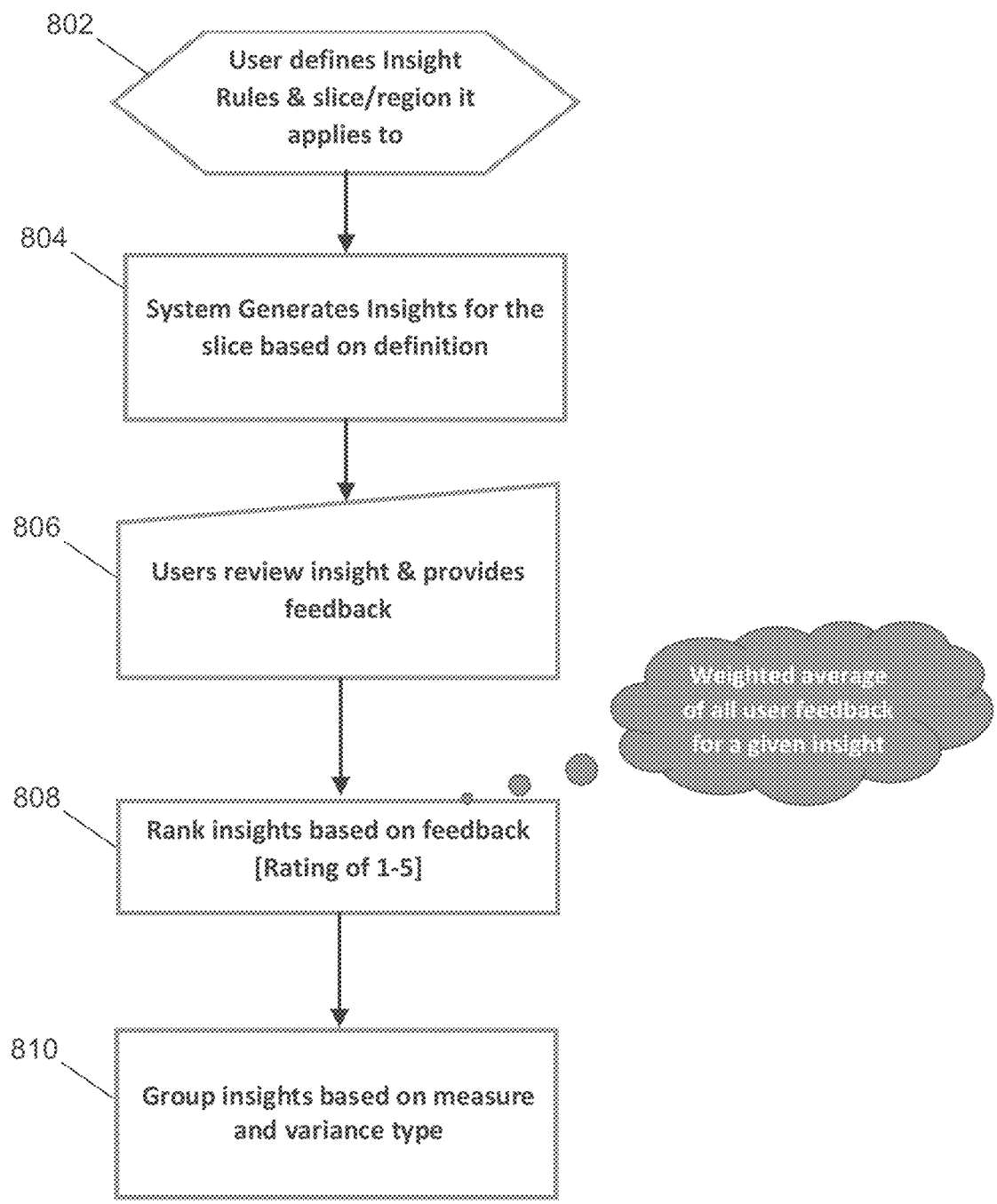
FIGS. 8-9 illustrate flow diagrams for generating a new insight from an initial insight according to an example embodiment.
Figure 9:
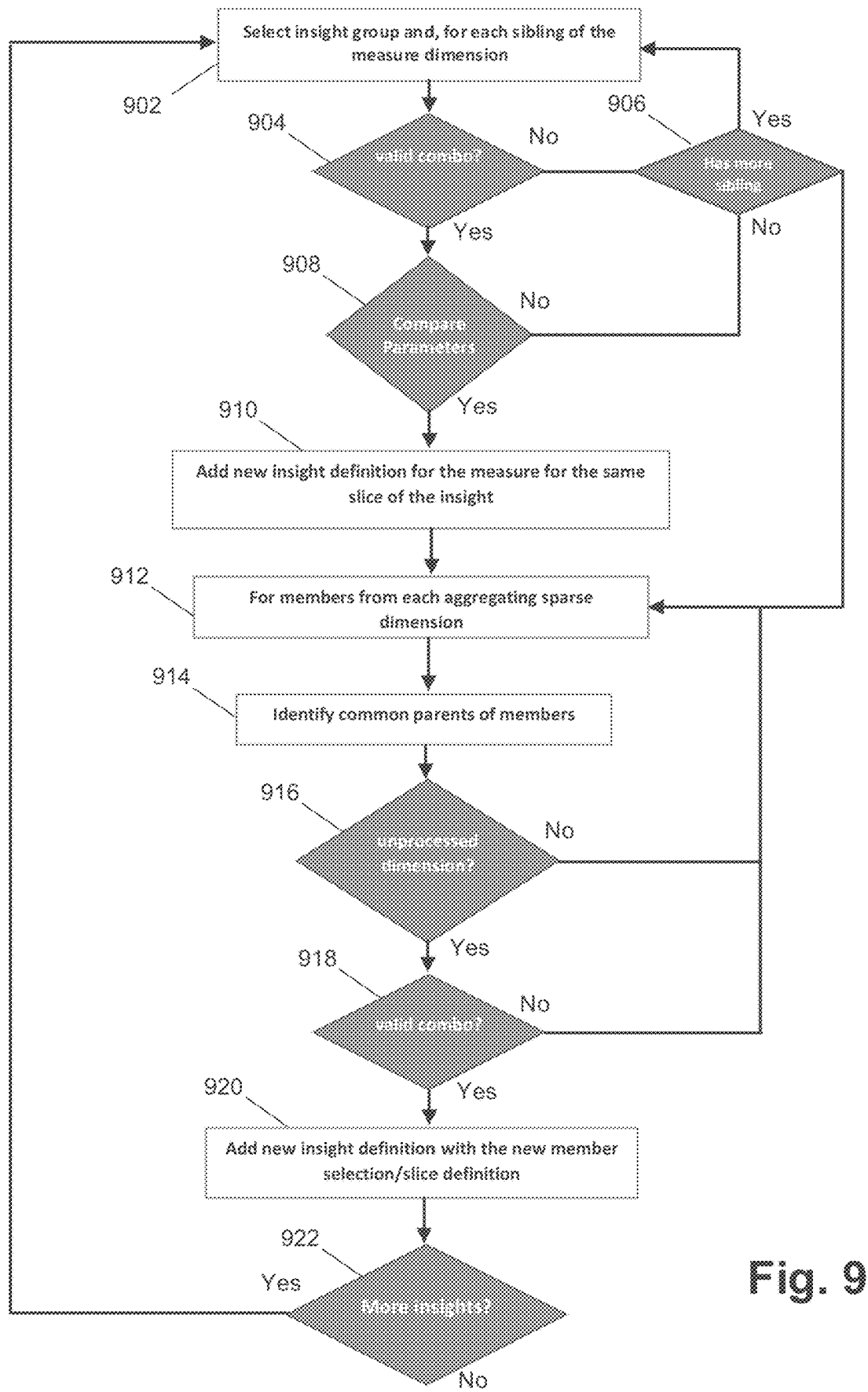
Figure 10:
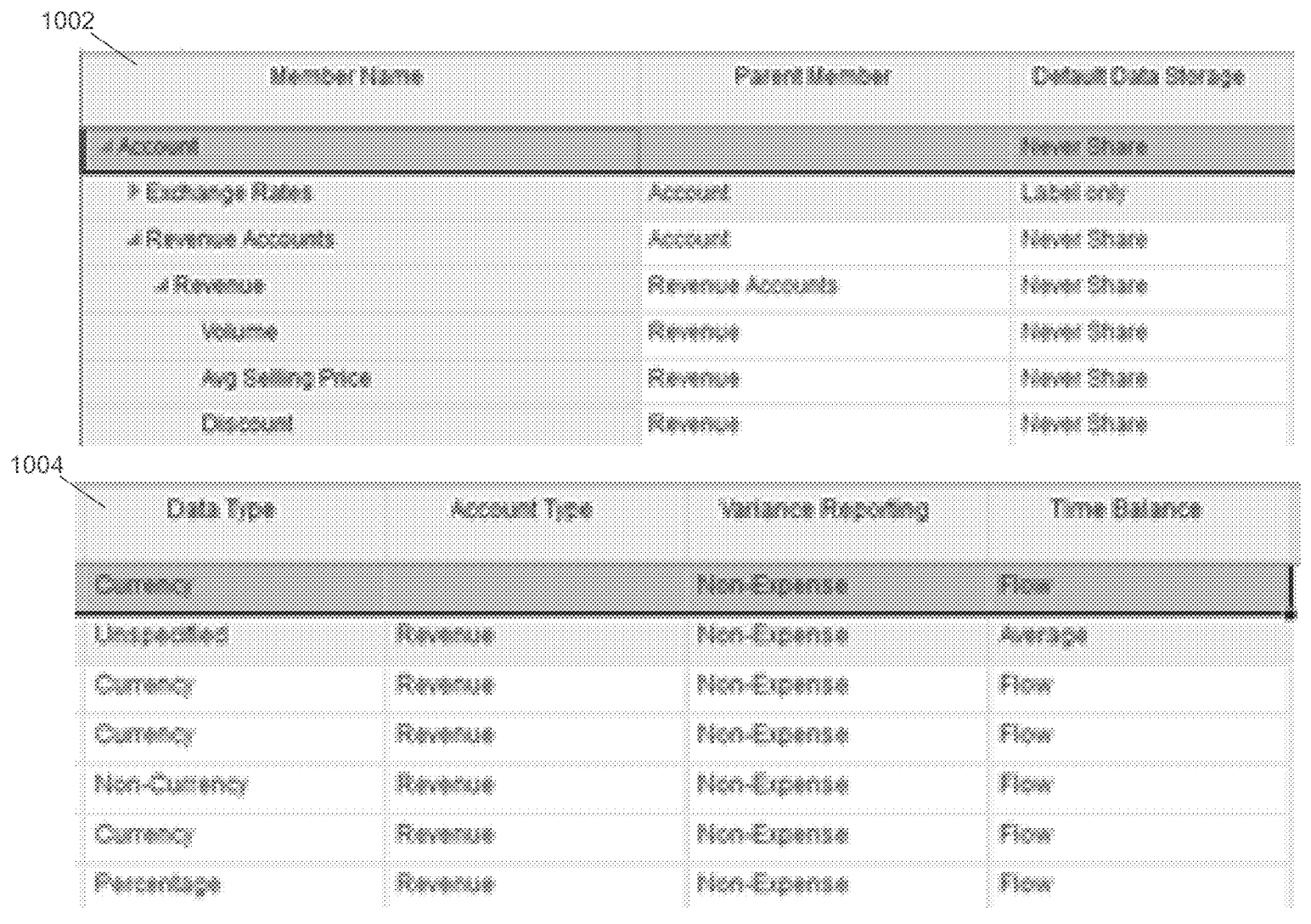
Figure 11:
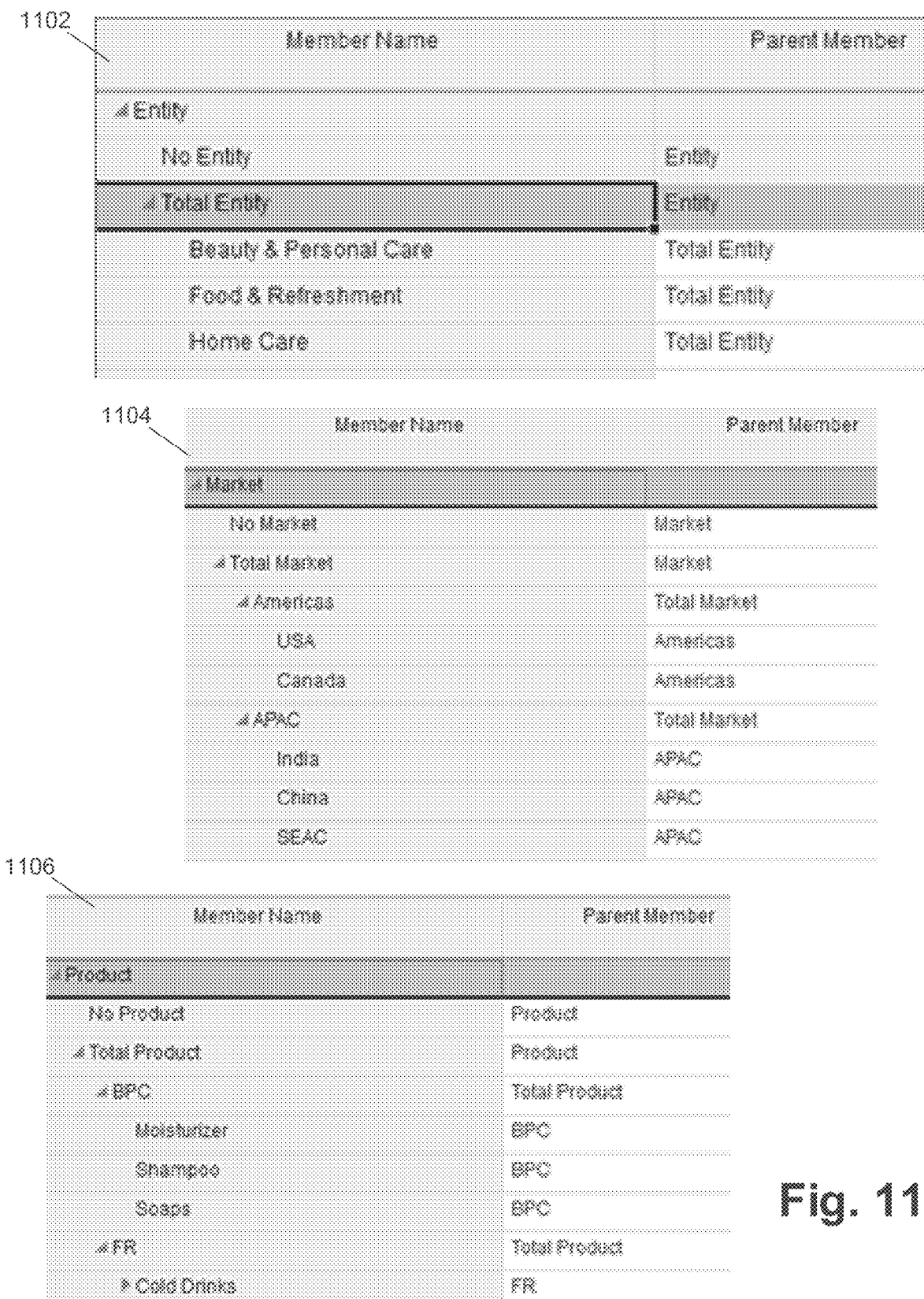

FIGS. 8-9 illustrate flow diagrams for generating a new insight from an initial insight according to an example embodiment. At 802, insight definitions can be received. For example, a number of insight definitions can be received for insights into multi-dimensional data defined by a hierarchy. The insight definitions can include a number of dimension members that define a slice of the multi-dimensional data for each insight. For example, the insight definitions can be received from a user via a user interface, from a set of default insights based on the enterprise/multi-dimensional data, and through any other suitable means. Two example insight definitions are contemplated with reference to the multi-dimensional data model and dimension hierarchies illustrated FIGS. 10-12 below. Any other suitable insight definitions can be implemented. At 804, embodiments can generate insights based on the insight definitions. For example, given the insight definitions and multi-dimensional data stored, actual insights can be generated. Insights based on the two example insight definitions and the multi-dimensional data model and dimension hierarchies illustrated FIGS. 10-12 are contemplated below.

At 806, feedback about displayed insights can be received. For example, the feedback can be an auto-adjust action performed on an insight (e.g., rating 5 in some embodiments), manual adjustment to data based on the insight (e.g., rating 4 in some embodiments), multiple views of the insight without leading to change in data (e.g., rating 3 in some embodiments), less than two views of the insight (e.g., rating 2 in some embodiments), and/or dismissing the insight without looking at the numbers (e.g., rating 1 in some embodiments). Any other suitable feedback can be received.

At 808, a ranking of the insight definitions can be generated based on the feedback. For example, when the feedback indicates an insight as useful (e.g., an auto-adjust action), the insight definition can receive a high rating and ranking and when the feedback indicates an insight as not useful (e.g., few or no views of the insight), the insight definition can receive a low rating and ranking. In some embodiments, an insight can have a number of instances of user feedback and an average can be used when ranking a given insight. For example, a weighted average can be used (e.g., where more recent feedback is weighted to result in greater influence on the calculated value).

In some embodiments, insights are ranked in an ascending order (e.g., rating of 5 is highest ranked, followed by 4, then 3, and so on). For example, insights that resulted in an auto-adjusted action (e.g., rating 5) can be ranked highest, followed by insights that resulted in a manual adjustment (e.g., rating 4), and so on. In some embodiments, a threshold can be used to prune the ranking. For example, a threshold ranking/rating (e.g., bottom half, rating of 2 or lower, and the like) can be used to discard insights from the ranking.

At 810, the insights can be grouped based on parameters, such as measure and variance type. For example, based on the measure dimension/member for the insight (e.g., revenue, volume, average selling price, discount, and the like) and the variance type, the ranked insights can be grouped. In some embodiments, variance type can include expense or non-expense. For example, with expense the variance can be calculated by subtracting the actual value from the budgeted value, while with non-expense the budgeted value can be subtracted from the actual value to determine variance. Insights with a compatible variance type (e.g., expense variance grouped together and non-expense variance grouped together) and measure (e.g., insights with the same measure dimension/member) can be grouped together.

In some embodiments, insights can be grouped according to variance type to generate groups with compatible data characteristics. When data elements have incompatible characteristics, operations between the values for the data elements (e.g., additions, subtractions, and other value operators) can result in erroneous data values. In other embodiments, other techniques can be used to group insights with compatible data characteristics. In some embodiments, insights can be grouped by measure such that the multi-dimensional data model can be explored using the measure dimension to generate new insights, as further detailed herein. In other embodiments, other dimensions can be used to explore new insights definitions.

After insights are grouped, at 902 of FIG. 9, an insight group can be selected. For example, an insight group (e.g., grouped by measure, variance type, or any other suitable criteria) can be selected for analysis. In some embodiments, an insight group can be selected based on the ranking for the insights within the group. For example, the rankings for the insights within a group can be averaged, and the insight group with the highest average ranking can be selected. Any other technique for selecting an insight group can be implemented.

In some embodiments, once an insight group is selected, a sibling of the measure dimension for the insight group can be selected for analysis. For example, some insight groupings can be based on a same measure dimension, and thus a sibling of this measure dimension can be selected for analysis. In some embodiments, the flow of FIG. 9 can iterate through the various siblings of the measure dimension for the insight group.

At 904, the new slice/intersection of data based on traversal of the multi-dimensional data model is verified as a valid combination. For example, for the given sibling of the measure dimension (e.g., sibling of the measure dimension for the selected group of insights selected at 902), the validity of the combination of the new slice/intersection of data given the multi-dimensional data model is verified.

In some embodiments, valid combinations can be defined based on the multi-dimension data model. For example, not all combination of various members in the dimensions may be valid due to incompatibility. In addition, analyzing invalid combinations can be computational wasteful. Consider that a Product A is sold in the USA but is not sold in India. A combination of Product A with India would therefore be invalid, and a rule can be used to define such a combination as invalid (and/or a rule can be defined to explicitly define valid combinations). Discovery of invalid combinations when exploring the multi-dimensional data model for new insights can enable efficient processing. In some embodiments, discovery of an invalid combination can be achieved through a database query or use of logic/rules (e.g., an application programming interface ("API") call) that determine whether a given combination is valid for the multi-dimensional data model. Any suitable technique for determining valid combinations can similarly be implemented.

In some embodiments, when the sibling of the measure dimension does not present a valid combination, the flow proceeds to 906 where it is determined if the measure dimension for the insight group has another sibling. If another sibling is available, the flow returns to 902 to select the available sibling for processing. If another sibling is not available, the flow proceeds to 912.

In some embodiments, when the sibling of the measure dimension presents a valid combination, the flow continues to 908, where parameters for the sibling measures are compared. For example, the parameters can include data type (e.g., numeric, non-numeric, and the like), account type (e.g., expense, revenue, and the like), time balance (e.g., flow, average, and the like), variance reporting (e.g., non-expense), and the like.

In some embodiments, account type can be Expense (e.g., cost of doing business), Revenue (e.g., source of income), Asset (e.g., company resource), Liability and Equity (e.g., residual interest or obligation to creditors), or other similar concepts. Time Balance can be how a value is calculated over a time period, such as Flow (e.g., aggregate of values for a summary time period as a period total), First (e.g., beginning value in a summary time period as the period total), Balance (e.g., ending value in a summary time period as the period total), Average (e.g., average for all the child values in a summary time period as the period total), Fill (e.g., the value set at the parent is filled into its descendants), and other suitable time balances. An example definition for a set of these parameters can be:

| Account Type | Time Balance | Variance |
| --- | --- | --- |
| Revenue | Flow | Non-Expense |
| Expense | Flow | Expense |
| Asset | Balance | Non-Expense |
| Liability | Balance | Non-Expense |
| Equity | Balance | Non-Expense |

In some embodiments, an insight for one measure can be applicable when it is of a similar type and has similar behaviors to another measure. For example, a trend or insight for an Expense account may not be useful for a Revenue account. Embodiments compare these parameters to determine whether similarity exists such that the new slice/intersection of multi-dimensional data (e.g., with the sibling of the Measure dimension) would be useful. For example, Rent can have a time balance of Flow whereas Headcount of department can have a time balance of Balance. This difference in time balance means that insights using them may be different, and thus exploring insights across them may not be useful.

In some embodiments, the parameters (e.g., data type, account type, time balance, variance reporting, or any combination of these) for the original measure and the sibling measure can be compared, and when these parameters match (e.g., each parameter in the original measure matches the parameter in the sibling measure) the flow can proceed to 910. For example, matching parameters for data type, account type, and time balance can indicate that insights based on the sibling measure dimension may be useful. Any other suitable comparison can be implemented for the measure dimension or any other suitable dimension. In some embodiments, the flow proceeds to step 910 after each sibling of the measure dimension is analyzed (e.g., based on the flow of 902-908).

At 910, one or more interim insight definitions for the one or more sibling measures can be added. For example, the interim insight definition(s) can be similar to one of the insight definitions within the insight group, however the measure for the original insight definition can be swapped for the measure sibling. In some embodiments, a plurality of interim insight definitions can be added. For example, the insight group can include a variety of insight definitions, and each can generate an interim insight definition with the swapped sibling measure dimension. In some embodiments, a plurality of siblings can be analyzed, and thus the addition of interim insight definitions can be performed for each sibling measure (e.g., which is a valid combination and has matching parameters, per 904 and 908). After adding the interim insight definitions, the flow can proceed to 912.

At 912, a dimension within the insight group can be selected. For example, insights within the insight group have definitions that cover other dimensions (e.g., dimensions other than measure), and one of these other dimensions can be selected. In some embodiments, a priority order can be defined for traversing dimensions, and the other dimensions can be selected based on the priority order. In some embodiments, a dimension can be selected when it meets a criteria, such as a density criteria. For example, a dimension can be selected when it is (is defined as) sparse (e.g., given the multi-dimensional data model, many data values in the dimension are not available).

At 916, a common parent for members among the insights in the insight group can be identified (if one exists) based on the selected dimension. The insight definitions within the insight group can include the selected dimension defined at a certain member level (e.g., level within the hierarchy of the dimension). For example, insights within the insight group may include different product level members within the Product dimension. In some embodiments, it can be determined whether a common parent for the member level insight definitions (for the selected dimension) include a common parent. For example, given the Product dimension, a plurality of insight definitions within the insight group may include product level members that are under the same product line (e.g., a parent to the product level members). In this example, the product line member level of the Product dimension can be identified as the common parent. In some embodiments, a common parent can be identified when two or more insight definitions from the insight group are covered by the common parent.

At 916, it can be determined whether there is an unprocessed dimension. For example, the other dimensions (e.g., dimensions other than Measure) within the insight definitions for a group of insights can be processed (e.g., processed through 912-914). It can be determined whether a measure within these definitions has not yet been processed. If an unprocessed dimension exists, the flow can return to 912 to analyze the one or more unprocessed dimensions (and identify a common parent). At 918, after identification of a common parent for a dimension (or multiple common parents for multiple dimensions), it can be determined whether the combination of the new slice(s)/intersection(s) of data present a valid combination. For example, for an identified common parent given two insight definitions (e.g., within an insight group), the common parent can be substituted within the definition for one (or both) of the two insight definitions, and it can be determined whether the new slice/intersection of data (with the common parent substitute) presents a valid combination. In some embodiments, this can be repeated for each common parent identified to determine whether the new slice(s)/intersection(s) of data present valid combinations.

When a valid combination is presented, at 920 a new insight definition with the new dimension definition (e.g., substitute common parent) can be added. For example, for an identified common parent given two insight definitions (e.g., within an insight group), the common parent can be substituted within the definition for one (or both) of the two insight definitions, and when it is determined that the new slice(s)/intersection(s) of data (with the common parent substitute) present a valid combination, the new insight definition(s) can be added. In some embodiments, this can be repeated for each common parent identified to add new insight definitions for each slice/intersection of data that presents a valid combination.

In some embodiments, when the new insight definition(s) cover one or more of the interim insight definitions (e.g., given the multi-dimensional data model, encompass the scope of the interim insight definitions, or include the slice/intersection of data defined by the interim insight definitions), the covered interim insight definition(s) can be discarded or disabled. For example, since the new insight definition(s) cover the interim insight definition(s), insights can be generated using the new insight definition(s) and thus the covered interim insight definition(s) are redundant. In some embodiments, interim insight definitions that are not covered by the new insight definition(s) can become new insight definitions (rather than interim insight definitions).

At 922, if additional insight groups are available for analysis, the flow can return to 902 and another insight group can be selected for analysis. At 922, if no additional insight groups are available the flow can end.

An example of generating a new insight based on one or more initial insights and the structure of a multi-dimensional data model is detailed. For example, the functionality of FIGS. 8-9 can be used to generate a new (e.g., broader) insight definition given two initial insights definitions. In some embodiments, FIGS. 10-12 illustrate dimensions and members of a multi-dimensional data model in accordance with embodiments. For example, FIG. 10 illustrates measure dimension data 1002 and 1004. FIG. 11 illustrates entity dimension 1102, market dimension 1104, and product dimension 1106. FIG. 12 indicates dimensions 1202 that represent an order for traversing dimensions in some embodiments. The below represents an example class diagram for insight data in accordance with some embodiments.

| <<Insight Definition>> | |
|---|---|
| Member | measure |
| Member[ ] | slice |
| Member[ ] | scenarios |
| Metrics | historical |
| Metrics | future |
| String | formula |
| Boolean | disabled |

| <<Metrics>> | |
|---|---|
| int | varianceSensitivity |
| int | biasSensitivity |
| int | customSensitivity |

| <<Member>> | |
|---|---|
| String | dimension |
| String | member |
| String | parent |

| <<Insight>> | |
|---|---|
| MemberSelection | pov |
| Measure | keyMetric |
| double | value |
| Double | referenceValue |

-continued

| <<Insight>> | |
|---|---|
| int | type |
| Date | created |
| int | status |
| int | actionPerformed |
| Int | viewCount |
| int | priority |

| <<InsightGenerator>> |
|---|
| + generateInsights(List<InsightDefinition> defns) |
| + rankInsights( ) |
| + generateInsightDefinitions( ) |

Consider the example multi-dimensional data below with the dimensions entity, product, scenario, version, market, period (e.g., monthly), and measure (e.g., revenue, discount, volume, ASP).

| Entity | Product | Scenario | Version | Market |
|---|---|---|---|---|
| F&R | Cold Drinks | Actual | Final | US |

| FY 2019 | January | February | March | April | May | June |
|---|---|---|---|---|---|---|
| Revenue | 100,000 | 88,000 | 95,000 | 100,000 | 103,000 | 98,000 |
| Discount | 2% | 2% | 1% | 0% | 0% | 0% |
| Volume | 20,000 | 18,000 | 19,000 | 18,000 | 20,000 | 21,000 |
| ASP | 5.00 | 4.89 | 5.00 | 5.56 | 5.15 | 4.67 |

| FY 2019 | July | August | September | October | November | December |
|---|---|---|---|---|---|---|
| Revenue | 100,000 | 110,000 | 90,000 | 125,000 | 95,000 | 100,000 |
| Discount | 0% | 1% | 2% | 5% | 3% | 4% |
| Volume | 20,000 | 20,500 | 22,000 | 25,000 | 20,000 | 21,000 |
| ASP | 5.00 | 5.37 | 4.09 | 5.00 | 4.75 | 4.76 |

| Entity | Product | Scenario | Version | Market |
|---|---|---|---|---|
| F&R | Ice Cream | Actual | Final | India |

| FY 2019 | January | February | March | April | May | June |
|---|---|---|---|---|---|---|
| Revenue | 100,000 | 88,000 | 140,000 | 100,000 | 103,000 | 98,000 |
| Discount | 2% | 2% | 5% | 0% | 0% | 0% |
| Volume | 20,000 | 18,000 | 26,000 | 18,000 | 20,000 | 21,000 |
| ASP | 5.00 | 4.89 | 5.38 | 5.56 | 5.15 | 4.67 |

| FY 2019 | July | August | September | October | November | December |
|---|---|---|---|---|---|---|
| Revenue | 100,000 | 85,000 | 90,000 | 110,000 | 100,000 | 100,000 |
| Discount | 0% | 1% | 2% | 2% | 2% | 2% |
| Volume | 24,000 | 23,500 | 22,000 | 21,000 | 20,000 | 20,000 |
| ASP | 4.17 | 3.62 | 4.09 | 5.24 | 5.00 | 5.00 |

In some embodiments, an insight definition can be received, for example where a user identifies a data slice/intersection and measure dimension members to be evaluated. The below represents an example, in JavaScript Object Notation (JSON) format, of an insight definition:

```
{"id":1, "historicalInsights": {"scenario": "Actual", "slice": "Descendants (\"Total Entity\"),
USA, "Cold Drinks", "measure": "Volume", "metrics":{"varianceSensitivity": "medium",
"biasSensitivity": "high"}}}
{"id":2, "historicalInsights": {"scenario": "Actual", "slice": "Descendants (\"Total Entity\"),
India, "Ice Cream", "measure": "Volume", "metrics":{"varianceSensitivity": "medium",
"biasSensitivity": "high"}}}
```

Based on these example insight definitions, the below example insights can be generated:

```
{"id":"10001","keyMetric":"Volume","type":"historicalAnamoly","value":25000,"referenceV
alue":20208, pov: "Actual, F&R, USA, \"Cold Drinks\", Oct, FY2019"}
{"id": "10002","keyMetric":"Volume","type":"historicalAnamoly","value":26000,"referenceV
alue":20583, pov: "Actual, F&R, India,\"Ice Cream\", Mar, FY2019"}
```

The above insights can be expressed as: "Volume sales for 'Cold Drinks' for October, FY2019, and USA in F&R entity was found to be 23.7% higher than the average value of 20208"; and "Volume sales for 'Ice Cream' for March, FY2019, and India in F&R entity was found to be 26.31% higher than the average value of 20583". These insights can be displayed to a user that reviews and analyzes the insights along with the reference data. In an example, the user can adjust the FY2020 forecast based on the anomaly described by the insights. For example, a higher "discount" with more "average selling price" (ASP), seems to have increased the volume and thereby revenue for this product group. The user can take action to adjust the forecast, and thus implicitly provide feedback, which can translate to a feedback rating of 4 in some embodiments.

In some embodiments, an automatic insight generator can improve the coverage of insight regions. For example, embodiments can initially group the insights generated based on certain attributes, such as measure and variance type. In the above example, two insights can be identified based on the measure "Volume" with variance type "historicalAnamoly". Embodiments can select the first of these two insights and can begin analyzing the measures.

Embodiments can select the Volume measure and traverse the multi-dimensional data model to explore enhancement of the insight. For example, embodiments can traverse to the siblings of Volume, which include Discount and ASP, as illustrated by measure dimensions 1002 of FIG. 10. In this example, the time balance, Account type, and variance-reporting are all the same for these sibling dimensions, and although the data types are different, they are all numeric. Based on the results of this analysis, embodiments add the children of the parent of volume, which is Revenue in this example, to create a new insight definition in the first pass.

In some embodiments, an order can be set for dimensions to optimize the traversal. FIG. 12 illustrates dimensions 1202 that can represent an order in which dimensions can be traversed to explore new possible insight definitions. For example, embodiments can begin traversing by selecting the first sparse dimension. In this case, embodiments can begin with the product dimension, as illustrated in FIG. 12, thus identifying that the common parent for the two products "Cold Drinks" & "Ice Cream" is Food and Refreshment (FR), as illustrated by product dimension 1106 of FIG. 11. Embodiments can then verify that this new combination/intersection/slice (i.e., when using the common parent in the insight definition) is valid, for example, by replacing FR in the insight definition (along with the remaining dimension members) and verifying that the definition would return valid results.

Embodiments can then proceed to the next dimension, in this instance Market, as illustrated by dimensions 1202 of FIG. 12 and market dimension 1104 of FIG. 11. Embodiments can then traverse to find the common parent "Total Market" for USA and India, and again validate the combination for the new combination/intersection/slice. For example, it can be validated that the combination of FR and Total Market (with other dimension members in the slice for the insight definition) returns valid results. Embodiments can again move to next dimension Entity (as illustrated by dimensions 1202 of FIG. 12), and can determine that the Entity is same in both the insights.

Based on these traversals, embodiments generate a new insight definition that covers a different slice of data/intersection. For example, the previous two insights that covered more narrow slices of data can be disabled. As seen below, an insight that tracks the previous two insights, but covers a different slice (e.g., broader slice) of the multi-dimensional data can be defined. For example, rather than an individual market (e.g., USA or India), the new insight can cover descendants of "Total Market", rather than an individual product (e.g., cold drinks or ice cream) the new insight can cover descendants of "FR", and rather than volume the new insight can cover descendants of "Revenue".

```
{"id":3, "historicalInsights": {"scenario": "Actual", "slice": "Descendants (\"Total Entity\"),
Descendants (\"Total Market\"), Descendants (FR), "measure":
"Descendants(Revenue)", "metrics" :{ "varianceSensitivity": "medium", "biasSensitivity":
"high"}}}
```

Updates below definitions as below.

---

{"id":1, "historicalInsights": {"scenario": "Actual", "slice": "Descendants (\"Total Entity\"), USA, "Cold Drinks", "measure": "Volume", "metrics" :{ "varianceSensitivity": "medium", "biasSensitivity": "high"}}, "disabled": true}

{"id":2, "historicalInsights": {"scenario": "Actual", "slice": "Descendants (\"Total Entity\"), India, "Ice Cream", "measure": "Volume", "metrics":{ "varianceSensitivity": "medium", "biasSensitivity": "high"}}, "disabled": true}

---

As demonstrated by the dimension hierarchies illustrated in FIGS. 10-11, the new insight definition (e.g., broader definition) covers a different slice/intersection of data (e.g., larger slice/intersection) and thus can provide improved levels of insight into the multi-dimensional data. For example, with the new insight definition and given the multi-dimensional data for the China (represented below), USA (represented above), and India (represented above) markets, a number of new helpful insights can be generated for slices of data.

| Entity | Product | Scenario | Version | Market |
|--------|---------|----------|---------|--------|
| F&R | Cold Drinks | Actual | Final | China |

| FY 2018 | January | February | March | April | May | June |
|---------|---------|----------|-------|-------|-----|------|
| Revenue | 100,000 | 88,000 | 105,000 | 100,000 | 105,000 | 98,000 |
| Discount | 2% | 2% | 1% | 0% | 0% | 0% |
| Volume | 20,000 | 18,000 | 19,000 | 18,500 | 20,000 | 21,000 |
| ASP | 5 | 4.89 | 5.53 | 5.41 | 5.25 | 4.67 |

| FY 2018 | July | August | September | October | November | December |
|---------|------|--------|-----------|---------|----------|----------|
| Revenue | 100,000 | 110,000 | 90,000 | 88,000 | 85,000 | 75,000 |
| Discount | 0% | 1% | 2% | 2% | 2% | 1% |
| Volume | 20,000 | 23,500 | 22,000 | 20,000 | 19,000 | 19,500 |
| ASP | 5.00 | 4.68 | 4.09 | 4.40 | 4.47 | 3.85 |

| Entity | Product | Scenario | Version | Market |
|--------|---------|----------|---------|--------|
| F&R | Cold Drinks | Actual | Final | China |

| FY 2019 | January | February | March | April | May | June |
|---------|---------|----------|-------|-------|-----|------|
| Revenue | 100,000 | 88,000 | 95,000 | 100,000 | 130,000 | 98,000 |
| Discount | 2% | 2% | 1% | 0% | 4% | 0% |
| Volume | 20,000 | 18,000 | 19,000 | 18,000 | 28,900 | 21,000 |
| ASP | 5.00 | 4.89 | 5.00 | 5.56 | 4.50 | 4.67 |

| FY 2019 | July | August | September | October | November | December |
|---------|------|--------|-----------|---------|----------|----------|
| Revenue | 100,000 | 110,000 | 90,000 | 110,000 | 95,000 | 100,000 |
| Discount | 0% | 1% | 2% | 1% | 3% | 4% |
| Volume | 20,000 | 20,500 | 22,000 | 20,500 | 20,000 | 21,000 |
| ASP | 5.00 | 5.37 | 4.09 | 5.37 | 4.75 | 4.76 |

---

Figure 13:
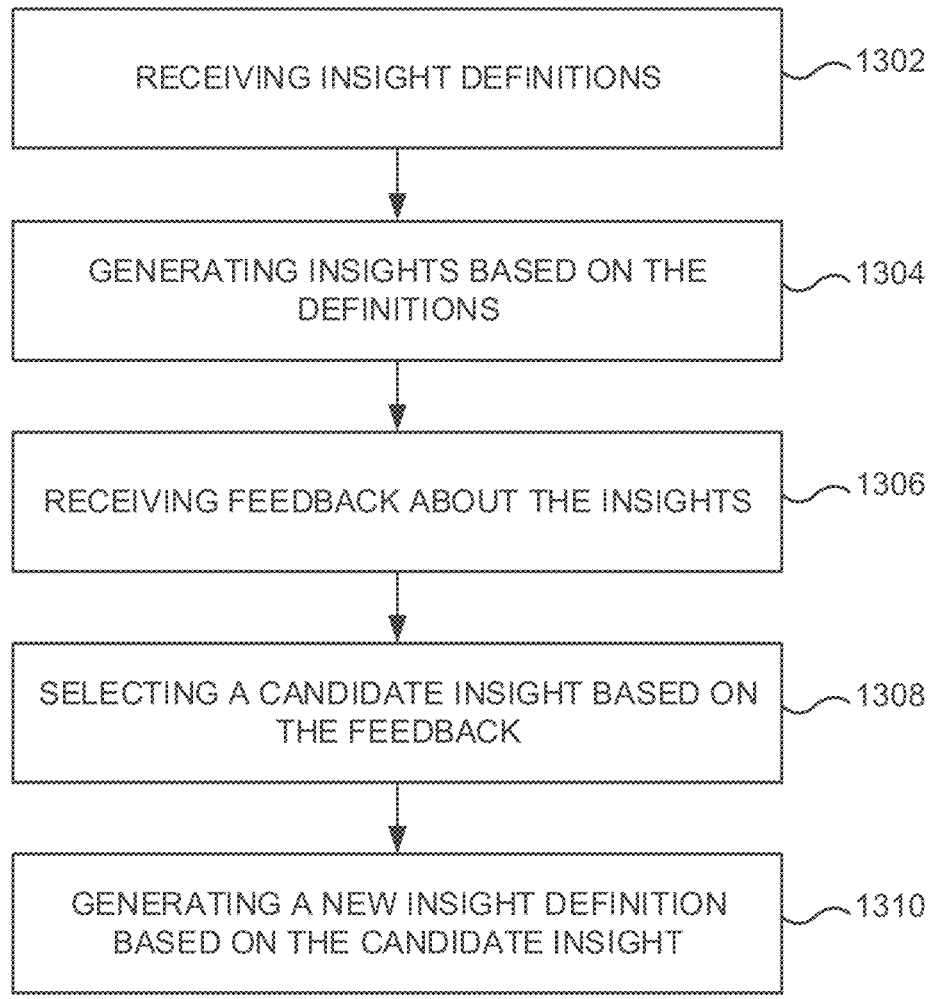
FIG. 13 illustrates a flow diagram for generating insights for multi-dimensional data according to an example embodiment.

FIG. 13 illustrates a flow diagram for generating insights for multi-dimensional data according to an example embodiment. In one embodiment, the functionality of FIG. 13 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1302, a plurality of insight definitions can be received for insights into multi-dimensional data, where the multi-dimensional data include a plurality of dimensions organized in a hierarchical structure, and the insight definitions include a plurality of members across the hierarchical dimensions that define a slice of the multi-dimensional data. For example, the insight definitions can be received from a user via a user interface, from a set of default insights based on the enterprise/multi-dimensional data, and through any other suitable means. In some embodiments, the multi-dimensional data can be enterprise planning data with one or more of the dimensions organized in a hierarchy of members, or can be any other suitable data.

At 1304, a plurality of insights of the multi-dimensional data can be generated based on the insight definitions. For example, a batch run can be processed that generates insights (e.g., metric data values for the insights) based on the insight definitions and the enterprise/multi-dimensional data.

At 1306, feedback about the generated insights can be received, where the feedback is used to assess a usefulness of the insights defined by the insight definitions. For example, a user can take an action based on a displayed insight, and the action can indicate a usefulness of the generated insight for particular insight definitions.

In some embodiments, descriptive data about a candidate insight defined by at least one of the insight definitions that corresponds to a candidate slice of the multi-dimensional data can be received. For example, the received descriptive data can be feedback about the candidate insight.

At 1308, a candidate insight can be selected based on the received feedback. For example, based on a usefulness metric a candidate insight can be selected (e.g., according to a ranking that indicates usefulness). In some embodiments, the selection of the candidate insight can be based on the received descriptive data (e.g., feedback).

At 1310, a new insight definition can be generated based on the candidate insight, wherein the new insight definition corresponds to a new slice of the multi-dimensional data, and the new slice of the multi-dimensional data is proximate to the candidate slice of the multi-dimensional data with respect to the hierarchical structure. For example, based on the candidate insight and its definition, a new insight definition can be generated that is similar to the candidate insight but covers a different cross-section of the multi-dimensional data.

In some embodiments, for at least a first dimension, the insight definition for the candidate insight includes a first candidate member of the first dimension, the new insight definition includes a first new member of the first dimension, and the first new member is a sibling to the first candidate member with respect to the hierarchical structure. For example, the new slice of the multi-dimensional data can be proximate to the candidate slice of the multi-dimensional data with respect to the hierarchical structure based on the first candidate member of the first dimension being a sibling of the first new member of the first dimension.

In some embodiments, for at least a second dimension, the insight definition for the candidate insight include a second candidate member of the second dimension, the new insight definition include a second new member of the second dimension, and the second new member is a parent to the second candidate member with respect to the hierarchical structure. For example, the new slice of the multi-dimensional data can be larger than the candidate slice of the multi-dimensional data with respect to the hierarchical structure at least based on the second new member being a parent to the second candidate member.

In some embodiments, the new insight definition is generated based on the candidate insight and another candidate insight defined by at least one of the insight definitions that corresponds to another candidate slice of the multi-dimensional data, where the new slice of the multi-dimensional data is proximate to the candidate slice of the multi-dimensional data and the another candidate slice of the multi-dimensional data with respect to the hierarchical structure. For example, for at least the first dimension, the insight definition for the candidate insight and the insight definition for the another candidate insight both can include the first candidate member for the first dimension.

In some embodiments, for at least a second dimension, the insight definition for the candidate insight include a second candidate member of the second dimension, the insight definition for the another insight includes a third candidate member for the second dimension, the new insight definition includes a second new member for the second dimension, and the second new member is a common parent of the second candidate member and the third candidate member with respect to the hierarchical structure.

In some embodiments, the candidate insight and a plurality of other insights are generated based on the insight definitions and the multi-dimensional data, a plurality of new insights are generated based on the new insight definition and the multi-dimensional data, and one or more of the generated insights represent anomalies in the multi-dimensional data. For example, the new insight definitions can be used to generate new insights into the multi-dimensional data (e.g., during a batch run).

Embodiments predict migration techniques for database migrations using a trained machine learning model. For example, database migrations, such as migrations from on-premise computing devices to a cloud computing system, can be implemented using a number of different techniques and combinations of techniques, such as database replication, cloning, pluggable database implementations, and other techniques. Based on the circumstances for a migration, such as source database implementation/type, target database infrastructure, downtime criteria, bandwidth criteria, and other circumstances, some of these database migration techniques can be more effective than others. For example, often an expert may select the migration techniques based on experience.

Embodiments use a trained machine learning model to predict database migration techniques based on the circumstances for a given migration. For example, training data can include information for database migrations and techniques used to implement the migrations (e.g., techniques considered successful given the circumstances for the migrations). This training data can be used to train the machine learning model, where the training can configure the model to learn trends in the data. As such, the trained model can be effective at predicting migration techniques that will be effective given a set of circumstances for a database migration. In other words, a candidate database migration can be fed to the trained machine learning model, and predictions for migration techniques can be generated based on the learned trends within the training data.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for generating new insights for multi-dimensional data, the method comprising:
    receiving a plurality of insight definitions that define insights within multi-dimensional data, wherein the multi-dimensional data comprises a plurality of dimensions organized in a hierarchical structure, and the insight definitions comprise a plurality of members across the hierarchical dimensions that define a slice of the multi-dimensional data;
    receiving usage data about a set of insights defined by at least one of the insight definitions, wherein the set of insights are displayed to a plurality of users and the received usage data represents user interaction from the plurality of users prompted by the set of insights;
    selecting a candidate insight from the set of insights based on the received usage data about the candidate insight, the candidate insight corresponding to a candidate slice of the multi-dimensional data;
    analyzing the candidate insight by traversing the hierarchical structure of the multi-dimensional data, wherein the analyzing initializes at the candidate slice of the multi-dimensional data and traverses one or more dimensions of the hierarchical structure to analyze one or more additional slices of the multi-dimensional data model; and
    generating a new insight definition based on the analysis of the candidate insight, wherein the new insight definition corresponds to a new slice of the multi-dimensional data, the new slice of the multi-dimensional data corresponds to one of the analyzed additional slices of the multi-dimensional data that comprises a valid combination according to valid combination rules defined for the multi-dimensional data, and the candidate insight is disabled in response to generation of the new insight definition when the new slice of the multi-dimensional data is larger than the candidate slice of the multi-dimensional data with respect to the hierarchical structure of the multi-dimensional data.

2. The method of claim 1, wherein, for at least a first dimension, the insight definition for the candidate insight comprises a first candidate member of the first dimension, the new insight definition comprises a first new member of the first dimension, and the first new member is a sibling to the first candidate member with respect to the hierarchical structure.

3. The method of claim 2, wherein, for at least a second dimension, the insight definition for the candidate insight comprises a second candidate member of the second dimension, the new insight definition comprises a second new member of the second dimension, and the second new member is a parent to the second candidate member with respect to the hierarchical structure.

4. The method of claim 3, wherein the new slice of the multi-dimensional data is larger than the candidate slice of the multi-dimensional data with respect to the hierarchical structure at least based on the second new member being a parent to the second candidate member.

5. The method of claim 2, further comprising:
    generating the new insight definition based on the candidate insight and another candidate insight defined by at least one of the insight definitions that corresponds to another candidate slice of the multi-dimensional data, wherein the new slice of the multi-dimensional data is proximate to the candidate slice of the multi-dimensional data and the another candidate slice of the multi-dimensional data with respect to the hierarchical structure.

6. The method of claim 5, wherein, for at least a second dimension, the insight definition for the candidate insight comprises a second candidate member of the second dimension, the insight definition for the another candidate insight comprises a third candidate member for the second dimension, the new insight definition comprises a second new member for the second dimension, and the second new member is a common parent of the second candidate member and the third candidate member with respect to the hierarchical structure.

7. The method of claim 1, wherein the candidate insight and a plurality of other insights are generated based on the insight definitions and the multi-dimensional data, a plurality of new insights are generated based on the new insight definition and the multi-dimensional data, and one or more of the generated insights represent anomalies in the multi-dimensional data.

8. A system for generating new insights for multi-dimensional data, the system comprising:
    a processor; and
    a memory storing instructions for execution by the processor, the instructions configuring the processor to:
    receive a plurality of insight definitions that define insights within multi-dimensional data, wherein the multi-dimensional data comprises a plurality of dimensions organized in a hierarchical structure, and the insight definitions comprise a plurality of members across the hierarchical dimensions that define a slice of the multi-dimensional data;
    receive usage data about a set of insights defined by at least one of the insight definitions, wherein the set of insights are displayed to a plurality of users and the received usage data represents user interaction from the plurality of users prompted by the set of insights;

select a candidate insight from the set of insights based on the received usage data about the candidate insight, the candidate insight corresponding to a candidate slice of the multi-dimensional data;

analyzing the candidate insight by traversing the hierarchical structure of the multi-dimensional data, wherein the analyzing initializes at the candidate slice of the multi-dimensional data and traverses one or more dimensions of the hierarchical structure to analyze one or more additional slices of the multi-dimensional data model; and generate a new insight definition based on the analysis of the candidate insight, wherein the new insight definition corresponds to a new slice of the multi-dimensional data, the new slice of the multi-dimensional data corresponds to one of the analyzed additional slices of the multi-dimensional data that comprises a valid combination according to valid combination rules defined for the multi-dimensional data, and the candidate insight is disabled in response to generation of the new insight definition when the new slice of the multi-dimensional data is larger than the candidate slice of the multi-dimensional data with respect to the hierarchical structure of the multi-dimensional data.

9. The system of claim 8, wherein, for at least a first dimension, the insight definition for the candidate insight comprises a first candidate member of the first dimension, the new insight definition comprises a first new member of the first dimension, and the first new member is a sibling to the first candidate member with respect to the hierarchical structure.

10. The system of claim 9, wherein, for at least a second dimension, the insight definition for the candidate insight comprises a second candidate member of the second dimension, the new insight definition comprises a second new member of the second dimension, and the second new member is a parent to the second candidate member with respect to the hierarchical structure.

11. The system of claim 10, wherein the new slice of the multi-dimensional data is larger than the candidate slice of the multi-dimensional data with respect to the hierarchical structure at least based on the second new member being a parent to the second candidate member.

12. The system of claim 9, wherein the instructions further configure the processor to:

generate the new insight definition based on the candidate insight and another candidate insight defined by at least one of the insight definitions that corresponds to another candidate slice of the multi-dimensional data, wherein the new slice of the multi-dimensional data is proximate to the candidate slice of the multi-dimensional data and the another candidate slice of the multi-dimensional data with respect to the hierarchical structure.

13. The system of claim 12, wherein, for at least the first dimension, the insight definition for the candidate insight and the insight definition for the another candidate insight both comprise the first candidate member for the first dimension.

14. A non-transitory computer readable medium having instructions stored thereon that, when executed by a processor, cause the processor to generate new insights for multi-dimensional data, wherein, when executed, the instructions cause the processor to:

receive a plurality of insight definitions that define insights within multi-dimensional data, wherein the multi-dimensional data comprises a plurality of dimensions organized in a hierarchical structure, and the insight definitions comprise a plurality of members across the hierarchical dimensions that define a slice of the multi-dimensional data;

receive usage data about a set of candidate insights defined by at least one of the insight definitions, wherein the set of insights are displayed to a plurality of users and the received usage data represents user interaction from the plurality of users prompted by the set of insights;

select a candidate insight from the set of insights based on the received usage data about the candidate insight, the candidate insight corresponding to a candidate slice of the multi-dimensional data;

analyzing the candidate insight by traversing the hierarchical structure of the multi-dimensional data, wherein the analyzing initializes at the candidate slice of the multi-dimensional data and traverses one or more dimensions of the hierarchical structure to analyze one or more additional slices of the multi-dimensional data model; and generate a new insight definition based on the analysis of the candidate insight, wherein the new insight definition corresponds to a new slice of the multi-dimensional data, wherein the new slice of the multi-dimensional data corresponds to one of the analyzed additional slices of the multi-dimensional data that comprises a valid combination according to valid combination rules defined for the multi-dimensional data, and the candidate insight is disabled in response to generation of the new insight definition when the new slice of the multi-dimensional data is larger than the candidate slice of the multi-dimensional data with respect to the hierarchical structure of the multi-dimensional data.

15. The method of claim 1, wherein the received usage data about the candidate insight represents one or more of an adjustment to a stored data value performed by a user in response to the candidate insight, or an action taken by a user in response to the candidate insight.

16. The method of claim 1, wherein the candidate slice of the multi-dimensional data and each of the analyzed additional slices of the multi-dimensional data comprise at least one parameter value, and the new slice of the multi-dimensional data corresponds to one of the analyzed additional slices of the multi-dimensional data that comprises a parameter value that matches the parameter value for the candidate slice of the multi-dimensional data.

17. The method of claim 1, wherein the new slice of the multi-dimensional data is larger than the candidate slice of the multi-dimensional data when the new insight definition is broader than an insight definition that corresponds to the candidate insight.

18. The system of claim 8, wherein the received usage data about the candidate insight represents one or more of an adjustment to a stored data value performed by a user in response to the candidate insight, or an action taken by a user in response to the candidate insight.

19. The system of claim 8, wherein the new slice of the multi-dimensional data is larger than the candidate slice of the multi-dimensional data when the new insight definition is broader than an insight definition that corresponds to the candidate insight.

20. The non-transitory computer readable medium of claim 14, wherein the new slice of the multi-dimensional data is larger than the candidate slice of the multi-dimensional data when the new insight definition is broader than an insight definition that corresponds to the candidate insight.

\* \* \* \* \*

UNITED STATES PATENT AND TRADEMARK OFFICE
CERTIFICATE OF CORRECTION

| | |
|---|---|
| PATENT NO. | : 11,734,310 B2 |
| APPLICATION NO. | : 16/806539 |
| DATED | : August 22, 2023 |
| INVENTOR(S) | : Daga et al. |

It is certified that error appears in the above-identified patent and that said Letters Patent is hereby corrected as shown below:

In the Specification

In Column 9, Line 59, delete "plan s" and insert -- plans --, therefor.

Signed and Sealed this
Twenty-eighth Day of May, 2024

*Katherine Kelly Vidal*

Katherine Kelly Vidal
*Director of the United States Patent and Trademark Office*